United States Patent
Obermaier et al.

[15] 3,680,806
[45] Aug. 1, 1972

[54] WINDING MANDREL

[72] Inventors: Georg Obermaier, Munich; Anton Stangl, Regensburg, both of Germany

[73] Assignee: Siemens Aktiengesellschaft, Berlin and Munich, Germany

[22] Filed: Sept. 30, 1970

[21] Appl. No.: 76,670

[52] U.S. Cl. ................................. 242/68, 242/68.5
[51] Int. Cl. ............................................ B65h 75/02
[58] Field of Search ....... 242/68, 56.1, 72, 68.1, 68.3, 242/68.4, 68.5

[56] References Cited

UNITED STATES PATENTS

| | | | |
|---|---|---|---|
| 1,633,084 | 6/1927 | Flanigan | 242/68.4 |
| 1,955,489 | 4/1934 | Duncan | 242/68.4 |
| 3,224,702 | 12/1965 | Jones | 242/68.4 |
| 1,555,627 | 9/1925 | Bock | 242/68.4 |

*Primary Examiner*—George F. Mautz
*Assistant Examiner*—Edward J. McCarthy
*Attorney*—Hill, Sherman, Meroni, Gross & Simpson

[57] ABSTRACT

A winding mandrel for winding webs of a conductor and a dielectric in the formation of an electric capacitor may be made of a plastic material to which the webs may be attached and is of a length less than the width of the webs so that when it is left in place in the completed capacitor the mandrel will have its ends recessed inwardly from the outer end faces of the completed capacitor. To facilitate winding of webs on the shorter winding mandrel the generally cylindrical body member of the mandrel has opposite first and second ends with at least one of the ends having a configuration including a self-centering bore and a tooth means. The bore is in the shape of a conical frustrum with a cone shaped smaller inner end. The tooth means includes a plurality of teeth shaped complementary to a winding chuck means. Each tooth is configured to have a generally flat surface lying in a generally longitudinal plane with a sloping surface adjacent the inner end of the flat surface and extending upwardly therefrom. The outer end of the generally flat surface intersects a narrow generally planar surface extending generally transverse to both the axis of the body member and the flat surface. The opposite edge of the narrow planar surface intersects the upwardly sloping surface from the next adjacent tooth. Four teeth are advantageously provided on an end. The teeth may be provided on both ends and may be set to have the sloping surface face in the same or opposite directions on each end. Mandrels of different lengths may be provided with each different length having a different color for identification.

8 Claims, 2 Drawing Figures

PATENTED AUG 1 1972  3,680,806

INVENTORS
Georg Obermaier
Anton Stangl

BY
ATTYS.

WINDING MANDREL

BACKGROUND OF THE INVENTION

1. Field of the Invention

This invention generally relates to a material forming means on which a web of material is wound. More particularly, the invention concerns a winding mandrel on which webs of an electrical conductor and dielectric are wound to form electric capacitors of the roll-type.

2. Prior Art

In the production of roll-type capacitors it is advantageous to wind the alternate layers of dielectric and conductor on a forming mandrel. Once the capacitor is formed, however, the mandrels of the prior art have been found to present problems. Thus, after the winding process the prior art has taught removing the winding mandrel but this has not been found satisfactory in that it presents the danger that the inner condensor layers may be destroyed during the pulling removal of the mandrel. Also, with the mandrel removed there is the danger that during the spraying of the roll-end contact layers short circuits will be produced between the two roll ends through the hole left by the mandrel. To overcome this problem the prior art teaches using what may be referred to as "lost winding mandrels" wherein the winding mandrel is allowed to remain in the finished capacitor body. The disadvantages of this use of "lost winding mandrels" is that they extend further than the end faces of the condensor body so that winding chucks may be engaged with these projecting portions. Because these projecting portions are undesirable in a completed capacitor they must be cut off afterwards. This, however, is undesirable in that it requires an additional working step and also produces the danger that the projecting coating edges and edges of the dielectric foils may be damaged.

A further known method is to close the hole left by the mandrel with a rod or ball, however, this method also has the disadvantages that the insertion of the rod or ball will tear the capacitor layers and/or damage the end faces.

SUMMARY OF THE INVENTION

Accordingly, it is an object of this invention to overcome the disadvantages of the prior art by providing a winding mandrel which is efficient and economical in manufacture and use. The embodiment of the "lost" winding mandrel according to the invention which meets these criteria is of a length less than the width of the conductor and dielectric webs forming the capacitor and when in place is recessed from the capacitor end faces. The mandrel has opposite end face configurations including a self-centering bore and tooth face.

The mandrel comprises a generally cylindrical body member having opposite first and seconds ends. Each of the first and second ends has what may be termed an outer end face. At least one of the ends has a dead end bore or socket therein extending from the end face into the body member. Also at least one of the end faces has tooth means thereon adapted to engage a complementary shaped winding chuck so that a joint is formed with the winding chuck that provides excellent torque transmission.

The bore or socket includes what may be called a first portion and a second portion with the first portion being in the shape of a conical frustrum decreasing in size as it extends into the body member with the larger diameter on the outside near the end face and a smaller diameter on the inside near the dead end. The second portion may be of a conical configuration and forms the dead end. The bore or socket serves as a self-centering means for the chuck as it is moved toward and into engagement with the tooth means.

The tooth means includes a plurality of teeth wherein each of the teeth has a generally planar or flat surface generally lying in a plane that is parallel to the longitudinal axis of the body member. A sloping surface is adjacent to each of the planar or flat surfaces and extends upwardly from a point near the inner end of the flat surface to a point where it intersects a narrow surface area which lies in a plane that is generally transverse to the axis of the mandrel body member. In practice it has been found that four teeth provide excellent results.

The teeth on the first and second ends may be set the same or may have an opposite configuration. In the case of an opposite set the sloping surface of each tooth on the first end extends in one direction from each of the planar or flat surfaces of the teeth that lie in a longitudinal plane and the sloping surfaces of the teeth on the second end extend in an opposite direction to that of the first end. Where the teeth are the same on both ends the sloping portions extend in the same direction on both the first and second ends. This variation in the teeth will allow ready changes in the direction of rotation of the mandrel or make possible the use of the same mandrel for winding capacitors in an opposite direction.

The winding mandrel may be made of a plastic material and may be produced by spraying. The tooth means and the bore means may be formed during this spraying process. With the insulating plastic construction the webs of both the conductor and the dielectric may be welded or glued directly onto the mandrel to provide a durable construction.

The length and diameter of the capacitors, of course, varies and therefore requires mandrels of different sizes. To distinguish these sizes we have found it advantageous to make each of the different sized mandrels of a different color.

In the production of a capacitor with the device of the invention, a winding chuck is brought into engagement with the end or ends of the mandrel and is centered by the tapered bore so that the winding will be smooth and even. The complementary teeth on the winding chuck will engage the teeth on the mandrel face and provide a positive torque connection which will allow positive and even transmission of the winding power. With the mandrel of a length less than the width of a web the material being wound thereon the mandrel will not interfere with the subsequent use of the finished capacitor. To avoid interference with the web material the winding chuck may be of a diameter less than the diameter of the mandrel.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
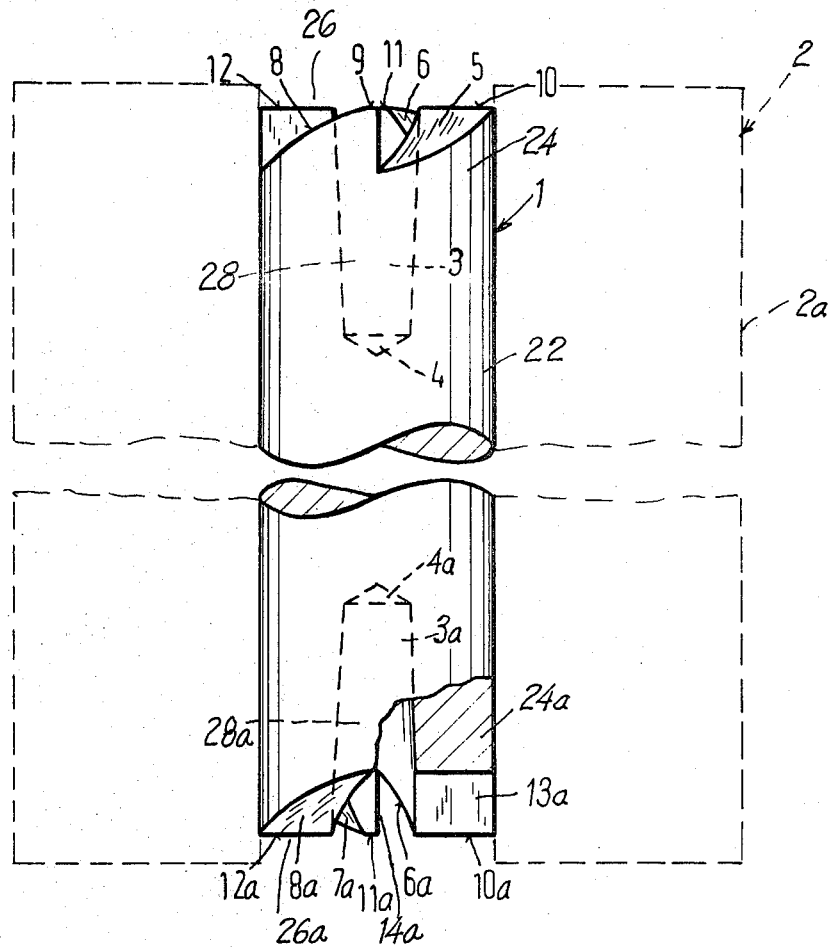
FIG. 1 is a longitudinal view of the mandrel with parts in section and showing in dotted lines the outline of the capacitor winding thereon.

A winding mandrel 1 according to the invention may be used to form the core of a capacitor generally indicated at 2 in FIG. 1 with the cross sectional outline of the capacitor windings 2a indicated by dotted lines.

The mandrel 1 comprises a generally cylindrical body member 22 having a first end 24 and a second end 24a. At least one end and usually both of the first and second ends have a configured end face indicated at 26 and 26a, respectively. The end face configuration on one or both ends has a dead end bore or socket 28, 28a therein extending from the end faces 26, 26a, respectively, into the body member 22. As shown, the bore or sockets 28, 28a are comprised of two geometrical shapes. Thus, a first portion 3, 3a has a frustoconical shape and a second portion indicated at 4, 4a has a cone shaped configuration which forms the dead end. In use, the bore or bores receive a centering pin, not shown, that serves as a self-centering means for a winding chuck means, not shown, as the winding means is moved toward and into engagement with an end face 26, 26a.

At least one of the end faces 26, 26a has tooth means thereon adapted to engage the complementary shaped winding chuck whereby a joint is formed with the winding chuck that provides for torque transmission so that the capacitor may be wound on the mandrel 22. In practice one end of the web that forms the capacitor indicated at 2a is attached to the mandrel 22 and the mandrel 22 is rotated to form the capacitor thereon. A suitable coating on the outside of the wound portion completes the production.

Figure 2:
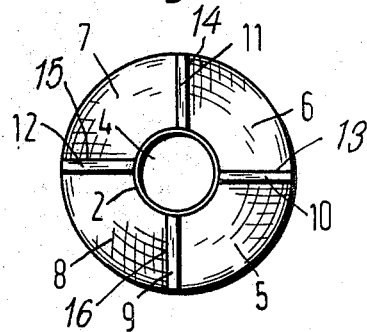
FIG. 2 illustrates the winding mandrel of the invention as seen from one end.

The tooth means which may occur on any one or both of the ends 26, 26a include a plurality of teeth, four, as shown, wherein each of the teeth has a generally planar or flat surface generally lying in a plane that is parallel to the longitudinal axis of the body member. Thus, referring to the first end face 26 as shown in FIGS. 1 and 2 the generally planar or flat tooth surfaces are indicated at 13, 14, 15 and 16. At the base or inner most portion of each of the planar surfaces there begins a sloping surface shown at 5, 6, 7 and 8 which extends upwardly from that point to a point on the outermost portion of the face where it intersects a narrow surface area shown on the first end face 26 as 9, 10, 11 and 12. These narrow surface areas lies in a plane that is generally transverse to the axis of the mandrel body member 22. The second end 24 and the second face 26a may be similarly configured as shown by corresponding reference numerals having a suffix a.

The teeth on the first and second ends may be set the same or may have an opposite set. Thus, the surfaces 5, 6, 7 and 8 of the first end 26 may rise to the right while the surfaces 5a, 6a, 7a and 8a of the second end 26a may rise to the left. In the case of an opposite set the mandrel will always be in position for rotation in a first direction regardless of which end is toward a winding chuck that is applied from one end as may be the case with a short mandrel. With a long mandrel or where a large torque is to be transmitted as would occur when capacitors with large diameters are wound, the winding mandrel may be driven from both ends in which case the teeth would be set the same on both ends so that the slipping portions extend from the planar surface areas in the same direction on both ends. The lengths of the winding mandrels range in size from about 5 to 30 millimeters and have a diameter of about 20 millimeters. In such cases the large outer diameter of the end bores 28, 28a is about 0.75 millimeter and the inner diameter is about 0.6 millimeter. The length of the frustrum shaped part 3, 3a is about 2 millimeters and the width of the end surfaces 9, 10, 11, 12 and 9a, 10a, 11a and 12a is about 0.1 millimeter.

The narrow surface areas 9, 10, 11 and 12 is shown in FIG. 2, for example, provide an additional contact of the mandrel end face with the complementary shaped winding chuck so that wear of the outer edges of the rising or inclined surfaces 5, 6, 7 and 8 is significantly reduced and accordingly a more positive torque couple is provided.

In practice it has been found advantageous to make the winding mandrel of a plastic material by a method such as spraying. In such cases the tooth means and the bore means are integrally formed. With the mandrel made of an insulating plastic construction, the webs of both the conductor and the dielectric may be directly connected thereto as by welding or gluing so that a durable and positive construction is formed. Formation with the plastic material also allows each different sized mandrel to be made of a different color for ready identification both in production and in a completed capacitor.

In a production of a capacitor with a device of the invention, a drive spindle on a winding chuck means having a configuration complementary to the configuration of the tooth means is brought into engagement with the end or ends of the mandrel to provide a positive and efficient torque connection. The winding chuck means extends about 0.3 millimeter into the roll during the winding process and may be of a diameter slightly less than the mandrel. With this design the mandrel may be of a length approximately 0.5 millimeter shorter than the width of the web members which are wound on it. It will thus be seen that after the winding means has been removed the lost winding mandrel does not project. Accordingly, the disadvantage of the prior art wherein the portion of the mandrel projecting beyond the end face had to be cut off has been eliminated, in addition the inside of the roll type capacitor is filled so that material sprayed onto the end faces of the completed capacitor such as shown at 2a cannot cause a short circuit through the center of the capacitor. From the above description of the invention it may be seen that we have provided a winding mandrel which is efficient and economical in manufacture and use.

Although minor modifications might be suggested by those versed in the art, it should be understood that we wish to embody within the scope of the patent warranted hereon all such modifications as reasonably and properly come within the scope of our contribution to the art.

We claim:

1. A winding mandrel for winding webs of a conductor and a dielectric in the formation of an electrical capacitor comprising a generally cylindrical body member having first and second ends, each of said first and second ends having an outer end face, said outer end faces having tooth means thereon, said ends having a dead end bore therein, said bores extending from their respective end face into the winding mandrel body member; and at least one of said end face tooth means thereon adapted to engage a winding means, said bore having a first portion and a second portion; said first portion of said bore being in the shape of a conicalfrustrum with a larger diameter on the outside near the end face and a smaller diameter on the inside near the dead end, said second portion being of a conical configuration and forming said dead end, said tooth means including a plurality of teeth each having a generally flat surface lying in a generally longitudinal plane and a sloping surface adjacent said flat surface; said sloping surfaces extending from said flat surfaces of said teeth in the same direction on said first and second ends.

2. A winding mandrel according to claim 1 wherein said mandrel length is less than the width of the said webs of material wound thereon and wherein said body member consists of an electrically insulating material.

3. A winding mandrel according to claim 1 wherein each sloping surface intersects a narrow, generally planar surface extending generally transverse to the axis of said body member.

4. A winding mandrel according to claim 1 wherein a plurality of mandrel lengths are provided, each of said different mandrel lengths having a different color.

5. A winding mandrel for winding webs of a conductor and a dielectric in the formation of an electrical capacitor comprising a generally cylindrical body member having first and second ends, each of said first and second ends having an outer end face, said outer end faces having tooth means thereon, said ends having a dead end bore therein, said bores extending from their respective end face into the winding mandrel body member; and at least one of said end face tooth means thereon adapted to engage a winding means, said bore having a first portion and a second portion; said first portion of said bore being in the shape of a conicalfrustrum with a larger diameter on the outside near the end face and a smaller diameter on the inside near the dead end, said second portion being of a conical configuration and forming said dead end, said tooth means including a plurality of teeth each having a generally flat surface lying in a generally longitudinal plane and a sloping surface adjacent said flat surface; said tooth means being provided on said first and second ends; said sloping surface extending in one direction from each of said flat surfaces of said teeth on said first end, and said sloping surfaces extending from said flat surfaces on said second end in a direction opposite to that of said sloping surfaces of said first end.

6. A winding mandrel according to claim 5 wherein said body member consists of an electric insulating material and said mandrel length is less than the width of the said webs of material wound thereon.

7. A winding mandrel according to claim 5 wherein each of said sloping surfaces intersects a narrow, generally planar surface extending generally transverse to the axis of said body member, 8. A winding mandrel according to claim 5 wherein a plurality of mandrel lengths are provided, each of said different mandrel lengths having a different color.

* * * * *